United States Patent [19]

Calvert, Sr.

[11] 4,315,243

[45] Feb. 9, 1982

[54] UNUSED FUEL INDICATOR FOR AUTOMOTIVE ENGINES EMPLOYING CATALYTIC CONVERTERS

[76] Inventor: Willard R. Calvert, Sr., 809 Teakwood Dr., Severna Park, Md. 21146

[21] Appl. No.: 187,485

[22] Filed: Sep. 16, 1980

[51] Int. Cl.³ .................. B60Q 1/00; G01K 7/04; G01K 17/08
[52] U.S. Cl. .................. 340/52 R; 73/118; 73/346; 123/198 R; 340/57; 340/595; 422/95
[58] Field of Search .......... 340/52 R, 57, 584, 595; 364/557; 73/118, 341, 346, 361; 123/198 R, 198 D; 422/95, 177, 180, 900

[56] References Cited

U.S. PATENT DOCUMENTS

| | | | |
|---|---|---|---|
| 3,882,451 | 5/1975 | Fujishiro et al. | 340/57 |
| 3,921,453 | 11/1975 | Platzer, Jr. | 340/57 X |
| 3,969,932 | 7/1976 | Rieger et al. | 73/118 |
| 4,122,720 | 10/1978 | Podl | 340/57 X |

Primary Examiner—John W. Caldwell, Sr.
Assistant Examiner—Joseph E. Nowicki
Attorney, Agent, or Firm—Charles W. Helzer

[57] ABSTRACT

The Unused Fuel Indicator (UFI) comprises a reliable thermo-electric/electronic circuit employing thermocouples attached to the catalytic converter of an emission control system for an automobile engine for providing easy readout of the condition of the automobile engine and the emission control system. A preferred kind of readout is provided by the sequential glowing of light indicators such as light emitting diodes (LEDs) wherein the sequence in which the LEDs are caused to glow, and their color is indicative of the proper functioning (or malfunctioning) of the automobile engine and catalytic converter emission control system. The UFI incrementally indicates the potential heat of pollutants in an automobile engine exhaust, which pollutants are converted by oxidation to heat produced by the catalytic converter. The heat is sensed by thermocouples which are differentially connected with the output of one opposing the output of the other. Hence, only the difference between the catalytic converters outlet temperature and inlet temperature is indicated to the driver of the vehicle (or other user of the UFI) by the incremental sequential glowing of the LEDs in a simple and effective manner that readily can be interpreted by an average driver, or inspector, mechanic, etc., who uses the UFI as a simple, inexpensive and effective engine emission system monitor.

The UFI is best when applied to a catalytic converter designed for the most stringent control of engine polluting emissions.

12 Claims, 4 Drawing Figures

UNUSED FUEL INDICATOR FOR AUTOMOTIVE ENGINES EMPLOYING CATALYTIC CONVERTERS

TECHNICAL FIELD

This invention relates to the conservation of costly fuel in short supply and to the provision of a novel Unused Fuel Indicator (UFI) for obtaining information about the performance of automobile engine emission control systems employing catalytic converters, for both saving fuel by avoiding conditions where an inordinate amount of unused fuel is burned in the catalytic converter of the emission control system and for indicating whether the emission control system is functioning properly as required by Federal Clear Air Act regulations. The air pollutants commonly found in auto exhausts are unused fuel which is burned to form heat products in the catalytic oxidation reaction taking place in the catalytic converter of the emission control system. The UFI provided by this invention informs the vehicle's driver (or other person seeking to monitor the performance of the emission control system) about the amount of this heat product. The information thus obtained aids the driver in conserving unleaded gasoline which he is required to buy in order to operate his vehicle by teaching him to adjust to gentler driving habits where it is indicated that unused fuel is being burned by the catalytic converter, and by helping him to keep the engine well tuned to minimize the amount of fuel entering into and the heat product from the catalytic converter. If the catalytic converter is not functioning properly, or fails to function as intended, that fact too is revealed by the UFI indication.

BACKGROUND PRIOR ART

There are a number of known monitoring systems for monitoring the performance of an automobile engine exhaust emission control system employing catalytic converters. One such system is described in U.S. Pat. No. 3,723,070, issued Mar. 27, 1973 by J. H. Houdry—entitled "Catalytic Oxidation Apparatus" and assigned to Oxy-Catalyst, Inc., West Chester, Pa. The Houdry system described in this patent employs a rather complicated and expensive gas analyzer along with temperature recorders and otherwise is too complex and expensive to consider installing on each automobile for continuously monitoring the performance of the engine and the emission control system. U.S. Pat. No. 3,882,451, issued May 6, 1975 to Takesh Fujishiro et al for a "Vehicular Catalytic Converter Failure Alarm System" and assigned to Nissan Motor Company Limited, Yokohama, Japan describes a much simpler and less expensive automobile engine emission control system monitor which is much less complex and less expensive than the monitor adopted by Houdry and which employs temperature sensors for measuring both the inlet and outlet exhaust gas temperatures from a catalytic converter of an automobile engine emission control system. The inlet temperature is compared to a first predetermined level temperature in a first comparator circuit to determine whether the inlet temperature to the catalytic converter is excessive. A second comparator is applied with the temperature difference between the inlet and outlet temperature and this too is compared with a preset temperature difference level in a second comparator circuit. The outputs of the two comparator circuits are then supplied through an AND gate to an alarm circuit. There is no way in which this particular monitor system can be employed or interpreted to assist a driver in conserving fuel as with the present UFI. Additionally, the monitor disclosed in U.S. Pat. No. 3,882,451 compares the catalytic converter inlet temperature to an arbitrarily chosen temperature level which is very difficult if not impossible to establish for all catalytic converter systems. This is due to the fact that the catalytic converter system in question may be inadequate with respect to available oxygen for conversion of pollutants in the automobile engine exhaust via the well known CO+HC oxidation by combustion reaction. Additionally, the linearity of the mass or space velocity of the exhaust gas ratio to the active catalytic surface of the catalytic reactor differs from catalytic converter to catalytic converter and finally the active catalytic surface in any particular catalytic converter is continuously being degraded through operation of the system particularly if any amount of leaded gasoline or contaminated unleaded gasoline is employed in operating the engine. For all of these reasons, the monitor system described in U.S. Pat. No. 3,882,451 is believed to be impractical for general utility purposes and furthermore it is more complex and expensive than the UFI made available by the present invention. U.S. Pat. No. 3,838,569 issued Oct. 1, 1974 to Luther Reck for a "Catalytic Converter Overheating Protection" device and assigned to General Motors Corporation describes a device wherein an electrically heated wire with constant current is installed in the exhaust decontamination system of an automobile engine in a manner such that the wire automatically interrupts the heating circuit by opening contacts upon becoming lengthened due to heating. The circuit automatically is re-established after cooling and the cooling times of the heating wire are measured and employed for determining and indicating the prevailing temperatures in the exhaust decontamination system. This arrangement, while perhaps operable, is too complex and subject to failure for wide-spread use in monitoring the efficiency of an automobile engine emission control system. U.S. Pat. No. 3,921,453, issued Nov. 25, 1975 to George E. Platzer, Jr. for a "Thermocouple System Having a PN Junction Compensation" and assigned to Chrysler Corporation, describes a thermocouple system for monitoring catalytic controllers and requires the use of a PN junction installed at the cold junction of the thermocouple system for cold junction compensation. The Platzer system also requires a reference temperature source, a comparator and a switching circuit wherein the desired switching temperature is entered electrically into the circuit for comparison to a compensated temperature signal derived by the thermocouple and PN junction temperature sensing devices. While the Platzer system employs differentially connected chromel/alumel thermocouples for sensing the inlet and outlet temperatures of a heated object being monitored by the thermocouple system, any similarity to the present UFI thereafter ends. The Platzer thermocouple system appears to be a general purpose temperature measuring system employing cold junction compensation and the use of predetermined or preset reference temperature levels. It is not specifically designed for use as an automobile engine emission control system monitor nor is it now clear how it might be modified to function as such a monitor from the disclosure of this patent.

DISCLOSURE OF INVENTION

From the foregoing discussion, it will be appreciated that while there are a number of known vehicular catalytic converter failure alarm systems available to the automotive industry, none of the known systems are entirely satisfactory because of complexities in their design, cost, lack of adaptability as a general purpose emission control system monitoring device useable with various different emmission control systems employed in the different model automobiles being produced today, presently on the road and required to be monitored in the future, or emission control systems to be built in the future in accordance with much more stringent emission control standards. In order to meet this need, the present UFI was devised.

It is therefore a principle object of this invention to provide a novel Unused Fuel Indicator instrument (UFI) which senses, computes and provides useful information concerning the proper functioning (or malfunctioning) of an automobile engine emission control system employing a catalytic converter, and supplies to a driver of the vehicle which may be powered by unleaded gasoline, liquefied gaseous fuel, or any other fuel which will burn in the engine to produce power, information which will enable the driver to react properly to conserve fuel and operate the engine economically and safely.

It is a further object of the invention to inform the driver of a vehicle (or other inspector, mechanic, repair man, etc.) whether or not the catalytic converter of a vehicle is actively oxidizing air pollutants such as unburned fuel in a normal manner as may be required by law.

A still further object of the invention is to provide a device which also will warn the driver of a vehicle equipped with a catalytic converter emission control system that excessive amounts of unused fuel are being burned in the catalytic converter in such a way that may be dangerous to the vehicle and objects beneath it such as dry leaves, tall grass and the like.

It is a feature of this invention to make available to the industry and automobile owners generally a simple, inexpensive but effective and reliable thermo-electric/electronic circuit, hereinafter referred to as an Unused Fuel Indicator (UFI) for converting the EMF produced by thermocouples attached to the catalytic converter of an automobile engine emission control system for providing easy readout of the proper functioning or malfunctioning of the emission control system and which is useable by an operator of the vehicle as a monitor for conserving fuel as will be explained more fully hereafter. A preferred kind of readout is the sequential glowing of light indicators such as light emitting diodes (LEDs) wherein the sequence in which the LEDs are caused to glow and their color, is indicative of the proper functioning (or malfunctioning) of the automobile engine and/or catalytic converter emission control system.

It is a further feature of this invention to provide such a UFI for incrementally indicating the potential heat of pollutants in an automobile exhaust and converted by oxidation in the catalytic converter to heat. The heat is sensed by thermocouples which are differentially connected with the output of one opposing the output of the other such that only the difference between the catalytic converters outlet temperature and inlet temperature is indicated to a driver of the vehicle (or other user of the UFI) by the incremental sequential glowing of the LEDs. The display formed by the sequentially operated, different color LEDs readily can be interpreted to be either a qualifying or non-qualifying performance of the catalytic converter and the engine by an average automobile driver, or inspector, repair man, mechanic, etc., who uses the UFI as a simple, inexpensive and effective engine emission control system monitor.

BRIEF DESCRIPTION OF THE DRAWINGS

Other objects, features and many of the attendant advantages of this invention will become better understood from a reading of the following detailed description when considered in connection with the accompanying drawings, wherein like parts in each of the several figures are identified by the same reference characters, and wherein.

BEST MODE OF CARRYING OUT THE INVENTION

Figure 1:
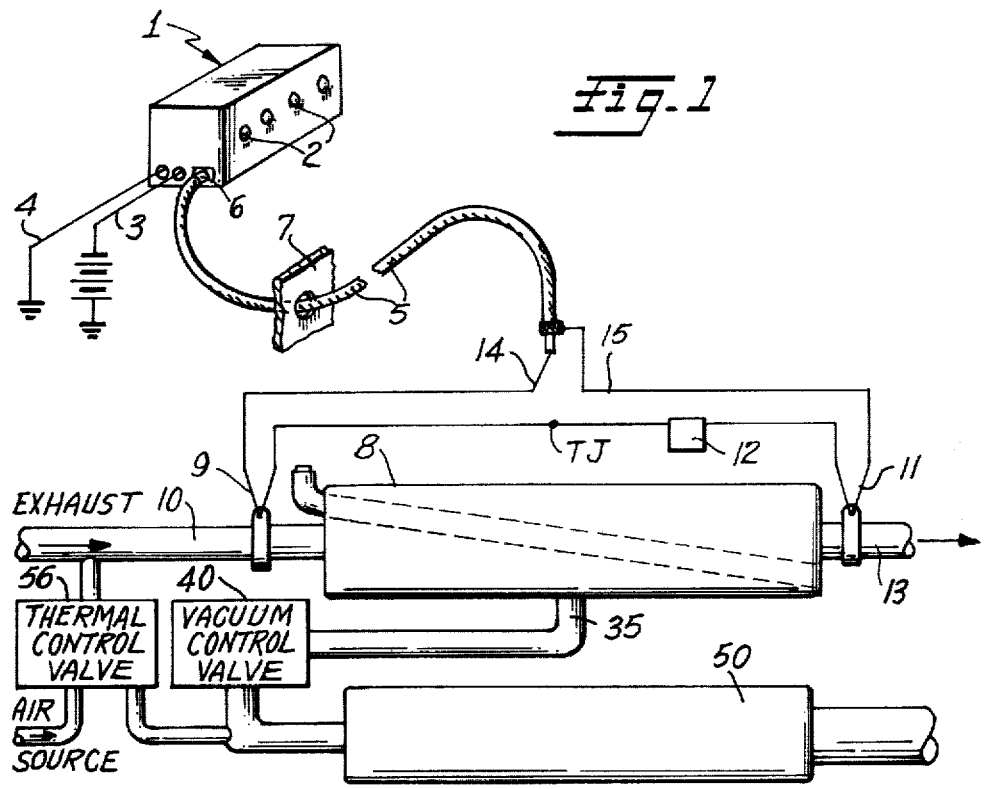
FIG. 1 is a partial, schematic perspective view of a UFI according to the invention showing the manner of its connection to the catalytic converter of a conventional, automobile exhaust emission control system, and the manner of its connection to the automobile electrical system.

Referring now to FIG. 1 of the drawings, a UFI indicator panel is shown at 1 with a plurality of different color light emitting diodes (LEDs) shown generally at 2. The indicator panel is mounted at some prominent point on the instrument panel of an automobile so that it can be readily used by the driver, and is attached to the automobile electrical system by a positive conductor 3 and a ground or negative wire 4. An insulated cable 5 having a grounded outer sheath extends from a pin jack 6, passes through a hole in the passenger compartment wall or the floor of the automobile body as shown at 7, and extends to the location of the catalytic converter 8 comprising a part of the automobile engine emission control system. Engine exhaust gases from the automobile engine and added air are supplied through the catalytic converter 8 in the direction shown by the arrows to efficiently and effectively convert the unused fuel content into heat. The cable 5 has its insulated conductor 14 attached to a chromel wire from a lower temperature inlet thermocouple 9 which is clamped to the inlet side 10 to the catalytic converter 8. Thermocouple 9 has an alumel wire connected to an alumel wire from a higher temperature thermocouple 11 which is identified by a flag 12 secured to the thermocouple wire. The higher temperature thermocouple 11 is attached to the outlet side 13 from the catalytic converter 8. The chromel wire of thermocouple 11 is connected by wire 15 to the outer grounded sheath of cable 5. The inlet and outlet thermocouples 9 and 11 preferably comprise well-known type K chromel/alumel thermocouples which are capable of operation over a useful temperature range to about 1800° F. and produce a change in potential of about 22 microvolts for each change of one degree Fahrenheit within this range. The cable 5 and lead wires to the thermocouples are enclosed together in a conduit and secured to the frame of the car in such a way that their insulating materials will not come in contact with the hot surface of catalytic converter 8 or other hot pipes which otherwise might burn them. UFIs which are intended for use exclusively by state, county of other governmental body inspection stations, garages and the like or automobile repair shops, will be designed in a manner such that the indicator panel 1 would be a free-standing unit (not for permanent installation in a car) and the thermocouples 9 and 11, respectively, would be secured to the inlet and outlet ends of the catalytic converters 8 of automobiles being tested by means of conventional clamps, or quick connect-disconnect devices to facilitate temporary installation of the thermocouples to the catalytic converters of automobiles whose emission control systems are to be tested.

Figure 2:
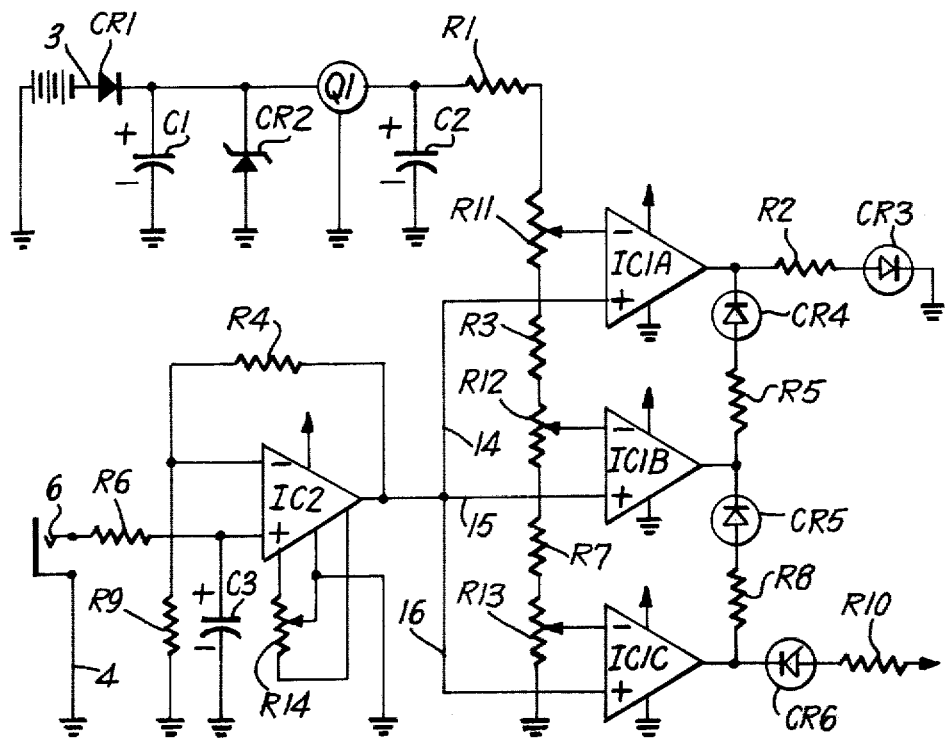
FIG. 2 is a schematic circuit diagram of the electronic processing circuitry for processing signals from thermocouples connected to sense the inlet temperature and outlet temperature, respectively, of engine exhaust gases being treated by the catalytic converter.
Figure 3:
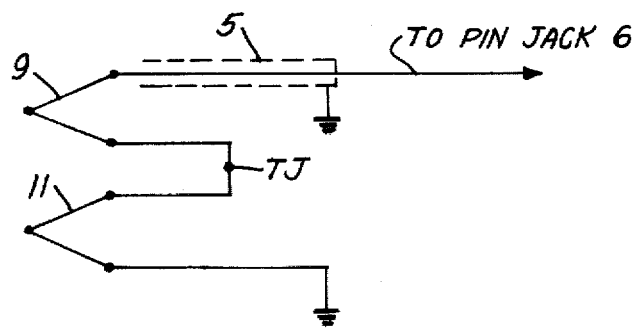
FIG. 3 is a simple, electrical interconnection diagram showing the manner of differentially interconnecting the inlet and outlet temperature sensing thermocouples that supply the circuit of FIG. 2.

FIG. 2 is a detailed, schematic circuit diagram of a preferred electronic processing circuit design for processing the temperature difference electric signal supplied to a pin jack input to the circuit shown at 6. The temperature difference electric signal derived by the differentially interconnected inlet temperature and outlet temperature thermocouples 9 and 11 shown in FIG. 3, is an electric signal obtained by subtracting the inlet temperature T, of the exhaust gases, supplied to catalytic converter 8 from the temperature T2 of the exhaust gases emitted from the outlet of the catalytic converter by electrically subtracting the electric signal developed by the inlet thermocouple 9 from the electric signal developed by the outlet thermocouple 11. This difference temperature electric signal is supplied via shielded and thermally insulated conductor 5 to the pin jack 6 shown in FIG. 2. The lead wires which are used to serially interconnect the thermocouples 9 and 11 in opposition at the point TJ shown in FIGS. 1 and 3 preferably are substantially of equal length and are shielded to the greatest possible extent to minimize generation of any thermally induced extraneous currents in the lead wire which could adversely effect the temperature signals derived by thermocouples 9 and 11. The input temperature difference signal applied through pin jack 6 is supplied via resistor R6 to the positive input terminal of an integrated circuit operational amplifier IC2. IC2 is a conventional, commercially available, integrated circuit amplifier whose terminals are interconnected by resistors R4, R9 and R14 together with capacitors C3 in accordance with the manufacturer's instructions to function as a conventional, operational amplifier for amplifying the input thermocouple derived temperature difference signal in a conventional manner. The amplified temperature difference signal is supplied through conductors 14, 15 and 16 to the positive input terminals of operational amplifiers IC1A, IC1B and IC1C, respectively.

The operational amplifiers IC1A, IC1B and IC1C are conventional, commercially available, integrated circuit amplifiers which are interconnected in a known manner in accordance with the manufacturer's supplied instructions to operate as differential or comparator amplifiers. For this purpose, the amplified temperature difference signal appearing at the output of the amplifier IC2 is supplied to the respective positive input terminals of each of the comparator amplifiers IC1A, IC1B and IC1C. The remaining or negative input terminals are connected to respective ones of resistors R11, R12 and R13 which are connected in series electrical relationship via resistors R1, R3 and R7 to operate as a voltage dividing network. This voltage dividing network in turn is supplied with a fixed (constant) 5 volt input supplied via the automobile 12 volt battery and conductor 3, diode CR1, capacitor C1 and zener diode CR2 together with a 5 volt regulator Q1 and filter capacitor C2. By reason of this arrangement, different level (amplitude) voltage biases will be supplied to the negative inputs of the respective comparators IC1A, IC1B and IC1C for comparison to the amplified temperature difference voltage signal derived by the differentially interconnected thermocouples 9 and 11 and amplified by amplifier IC2.

A sequentially operated, easily read (interpreted) indicator circuit is connected across the output of the comparator amplifiers IC1A, IC1B and IC1C for use by the driver or other person in readily determining whether or not unused fuel is being burned by the catalytic converter or whether indeed the catalytic converter is functioning properly. This preferred indicator is comprised by a plurality of different color, low cost light emitting diodes (LEDs) CR3, CR4, CR5 and CR6. The LED CR3 is connected between ground and the output of comparator amplifier IC1A via a resistor R2 and preferably is red in color, i.e., when energized it emits red-colored light. The LED-CR4 is yellow in color and is connected via resistor R4 across the outputs of comparators IC1A and IC1B. The LED-CR5 is green in color and is connected via resistor R8 across the outputs of comparators IC1B and IC1C. Finally, the LED-CR6 also is red in color and is connected via resistor R10 between the output of comparator IC1C and a +5 volt power supply output.

With the auto engine not running or immediately after startup, the inlet and outlet temperatures of the catalytic converter 8 will be substantially the same so as to produce a zero value or only very small temperature difference signal at the inputs to the comparators. It will be noted that each comparator starting with IC1C has a progressively larger value positive voltage supplied to its second or negative input terminal for comparison to the temperature difference signal which is a positive polarity. For so long as the temperature difference signal is zero value or very small, only the compartor IC1C is sufficiently conductive to overcome the back bias applied to LED-CR6 and render it conductive thereby emitting a red light. Glowing of the red LED-CR6 is indicative of the fact that the catalytic converter is not functioning due either to its not having reached its operating differential temperature because the engine exhaust gases do not include sufficient air for oxidation by the catalytic converter or because the catalyst has failed. After the engine has operated for a sufficient time to cause the catalytic converter to reach its operating temperature, under normal operating conditions, the outlet temperature should exceed the input temperature by some temperature difference value. If this temperature difference value is within the normal design operating range of the catalytic converter, comparator IC1B will be rendered conductive sufficiently to forward bias the green LED-CR5 causing it to emit a green light thereby indicating normal operation of the catalytic converter. Conduction of CR5 will back bias the red LED-CR6 causing it to turn off. In the event that the temperature difference signal then exceeds some preselected voltage level determined in accordance with the design of the catalytic converter with which the UFI is being used, and which indicates catalytic oxidation of some unused fuel but less than excessive amounts which would render the temperatures in the catalytic converter excessive for its designed characteristics, the comparator IC1A is rendered conductive. This causes LED-CR4 to glow and emit a yellow light and to back bias the LED-CR5 so as to cause it to turn off. Subsequently, if the temperature difference across the input and outlet of the catalytic converter exceeds a predetermined safe level of operation, the output from comparator IC1A attains a sufficiently positive level to cause LED-CR4 to be back biased and turn off and to turn on the red LED-CR3 thereby indicating that an excessive temperature condition exists in the catalytic converter.

The circuit design of the processing circuit shown in FIG. 2 of the drawings is properly tailored to the temperature versus output voltage characteristices of the type K chromel/alumel thermocouples 9 and 11. The circuit is based upon well known data for these thermocouples and may be designed to provide a first incremental increase in temperature range of, for example, about 500° F. inlet temperature versus a 570° F. outlet temperature. From the data tables available for these thermocouples, it can be determined that this difference in temperature will produce an output voltage difference of about 1.601 millivolts. After amplification by the input amplifier IC2, this input voltage will cause the circuit to turn off the red light LED-CR6 and to turn on the green light LED-CR5 in the above described manner. Glowing of the green light LED will then indicate that the catalytic converter 8 is functioning normally provided that it continues to glow through all operating modes of the automobile engine, namely idling, accelerating, normal cruising speeds and decelerating. Another incremental increase in temperature representing about a 300° F. difference from say 570° F. to 870° F. would result in the production of a 6.9 millivolt increase in the input voltage to the processing circuitry of FIG. 2. An increase of this extent would then cause the comparator circuit to turn off the green light LED-CR5 and turn on the yellow light LED-CR4 as described above. This would indicate that the catalytic converter is tending to overheat due to the catalytic oxidation of too much unused fuel which may be caused by one reason or another as explained hereafter. A further increase in outlet temperature of another 300° F. from say 870° F. to 1170° F. would then produce another 6.9 millivolt increase in the input signal supplied via pin jack 6 to the processing circuitry. This further increased input voltage would then cause the comparator circuit to turn off the yellow LED-CR4 and to turn on the red light LED-CR3 indicating production of an abnormal amount of heat and existence of a substantial fire hazard.

When permanently mounting the UFI in an automobile for monitoring the emission control system of the car, the indicator panel box 1 shown in FIG. 1 with its four small glow lights should be mounted in front of the driver, in a shaded space, where the glow lights can be seen readily at a glance without distracting the attention of the driver away from driving. Lead wire 3 should be connected to a cable which carries 12 volt current only when the ignition switch is on and cable 4 should be connected to the ground/frame of the car. The shielded cable 5 should be inserted through a hole to the underside of the car for attachment of the thermocouples of the catalytic converter in the above described manner. The higher temperature thermocouple with the flag 12 on it is clamped to the outlet pipe from the catalytic converter and the lower temperature thermocouple is clamped to the inlet pipe with both clamps being close to the body of the catalytic converter.

The first glow light to be lit is LED-CR6 which is red in color and is lit merely by turning the ignition on. Glowing of LED-CR6 indicates that the UFI is operational, and that the temperature T2 at the outlet pipe of the catalytic converter is warming up to become equal to or slightly greater than the inlet temperature T1. The second glow light LED-CR5 which is green in its color lights up when the converter outlet temperature T2 is about 70° F. higher than the inlet temperature T1. This green light continues to glow unless and until the unused fuel (air pollutants) exhausted by the engine into the catalytic converter through catalytic conversion produces enough heat to increase the output temperature T2 to say about 300° F. higher than the inlet temperature T1. All is well while the green light glows through all driving modes, that is to say at idle, cruising, when accelerating or decelerating, and indicates that the engine and the catalytic converter are operating within the normal design range.

The third glow light LED-CR4 which is yellow (amber) in color, is lit when the outlet temperature T2 is about 305° F. higher than the inlet temperature T1. The amber light continues to glow for so long as the outlet temperature T2 is more than 305° F. higher or above. The amber light when glowing indicates that the engine is exhausting slightly more unused fuel than it should normally. Steady cruising at 40-55 miles per hour should return the UFI to operation within the green light range. If this occurs, then more gentle acclerating, idling and decelerating should be undertaken by the driver in order to maintain the UFI within the green range, and this indicates that the driver can save fuel by adjusting to more gentle driving habits. If on the other hand, the amber glow light continues to be lit while cruising steadily at the 40-55 mph speed range, and does not return the UFI to operation in the green range, then the need for an engine tune-up is indicated in order to decrease the amount of unused fuel exhausted into the catalytic converter.

In the event that the fourth glow light LED-CR3 which is red in color, is lit upon the outlet temperature reaching a value of say about 605° F. higher than the inlet temperature T1, abnormal operation of the catalytic converter is indicated. When the LED-CR3 red light is glowing, the catalytic converter under the car also may be glowing. The total temperature in the catalytic converter under these conditions may be $T1+T2=1600°$ F. Such operating conditions of the engine emission control system indicates that an engine tune-up is an absolute necessity to correct a severe loss of unused fuel and reduce the hazard of fires being ignited by the glowing catalytic converter.

In addition to the above generalized situations, there are some special cases which must be observed by the driver or other person using the UFI. For example, if the first red light LED-CR6 glows either all or most of the time, the catalytic converter 8 probably has been deactivated by lead in the fuel, or inadequate catalyst or the catalyst surface was otherwise damaged, and should be replaced. Continuous glowing of LED-CR6 may also indicate that there is either no air or an insufficient air supply to support the catalytic oxidation of fuel in the catalytic converter as is the case when the engine has no air pump or other air supply means to the catalytic converter. Another special case may occur when the engine returns to the idle mode of operation after an extended cruise period. Under these operating conditions, the green light LED-CR5 may continue to glow even though the catalytic converter is not converting for the period of time required for the exhaust parts to have cooled to a temperature range where the inlet temperature T1 is substantially equal to or slightly lower than the outlet temperature T2.

As shown in FIG. 3, in mounting the thermocouple to a catalytic converter, the alumel (negative) wires are fastened together with one of the chromel (positive) wires being connected to ground via the shield wire of cable 5, and the other being connected via the single wire of cable 5 and pin jack 6 to the input of the processing circuitry. By so opposing one thermocouple output EMF against the other, the difference between the higher and lower temperatures is derived automatically with a very simple and inexpensive circuit connection. Consequently, the EMF supplied over cable 5 to the input of the processing circuitry represents the difference in the inlet and outlet temperature of the catalytic converter and becomes the measure of the heat product resulting from unused fuel burning in the catalytic converter. This temperature difference signal may be read out by other millivolt readout devices such as a digital display, or those which utilize a galvanometer type of instrument action, etc. However, the LED glow light indicators described above are preferred since they interpret the significance of the heat product range in increments in a manner which readily can be understood by the average driver or other user. The size of the temperature range increments to be indicated is chosen primarily from experience with catalytic converters of the type described in U.S. Pat. Nos. 2,937,490; 3,176,461 and 3,325,256. Other ranges of temperature increments may be substituted for particular types or designs of catalytic converters and thermocouple locations, particularly if experience with the UFI indicates that it is advantageous to do so.

Prior to 1975, the Federal standards for air pollutant emissions were developed, and were based upon a consensus of exclusive opinions. Subsequently, a schedule of emission standards ranging from the least stringent to the most stringent were written into the Federal Clean Air Act so that the standards changed progressively from 1975 through 1985. The designers of emission control systems for automobiles of each year's model, were obliged to meet the current standards then in effect, and progressively made more stringent. Thus, each model year's automobile emission control systems were certified by the Environmental Protection Agency (EPA) if the then currently used catalytic converter system and engines were found by test to be in compliance with the current standards then in effect.

Because the engine emission control systems installed on automobiles made in the years 1975-79 were designed in accordance with the then current emission standards to produce less than maximum oxidation of unused fuel by the catalytic converters employed in such systems, it is likely that the above-mentioned increments chosen for the UFI are too large to be representative of the incomplete pollutant conversions achieved by existing emission control systems on these earlier year model cars.

In order to achieve the less than maximum conversion of pollutants, automotive engine emission control system designers omitted or limited the supply of air which is essential to the chemistry of the oxidation of unused fuels in the catalytic converter. Additionally, the designers employed minimal amounts of catalyst surfaces in the existing converters without concern for the amounts of catalyst surfaces needed by the various mass flow rates of exhausts from various automotive engines, and the concentration of unused fuel therein. The use of such inefficient systems may be waived after state inspections commence. However, it also is likely that more efficient and effective emission systems may be required at some time in the future.

A UFI according to the invention may be calibrated or adjusted for use with different model car engine emission control systems by employing the following procedures:

(a) Remove one spark plug connector while operating the engine after the catalytic converter has become active (the UFI glow lights have changed from red to green). With the engine thus operating, a 4 cylinder engine will be discharging 25% unused fuel, a 6 cylinder engine will be discharging one sixth or 16.7% of its fuel as unused fuel and an 8 cylinder engine will be discharging one eighth or 12.5% unused fuel.

(b) With the one spark plug removed and after cruising followed by idling, the UFI lights should change in sequence through amber to the fourth (red) light.

The above operation test establishes that with one cylinder misfiring full time (which is highly wasteful of fuel as noted and is good reason for a tune-up), the UFI will indicate such condition and is proof that the UFI is operating properly.

INDUSTRIAL APPLICABILITY

Figure 4:
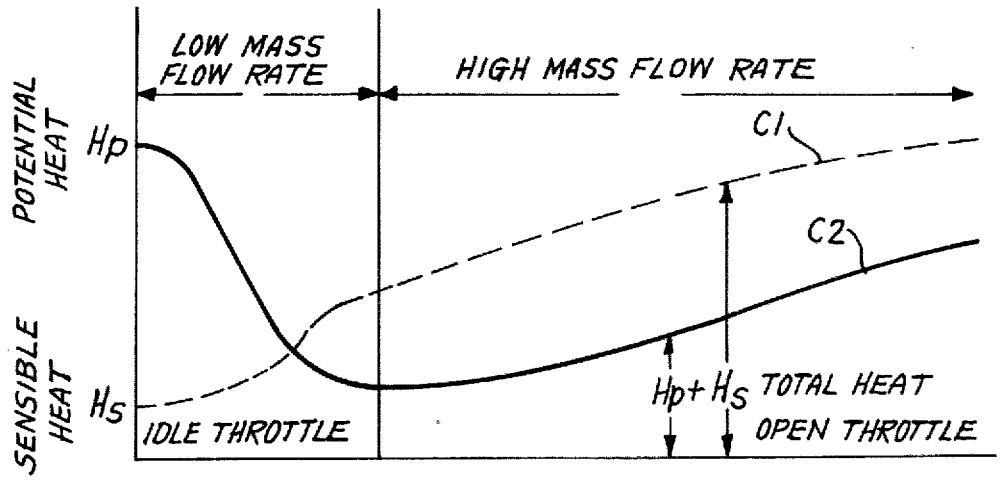
FIG. 4 is a graph which plots the potential heat, the sensible heat and total heat produced within a properly functioning catalytic converter during the oxidation of air polluting unused fuel contained in the exhaust from an internal combustion gasoline engine, plotted against the mass flow rate of the engine exhaust; and is illustrative of why it is essential for drivers of automobiles equipped with catalytic converters to be provided with some simple means for informing the drivers of the conditions existing in the catalytic converter for different driving modes and habits and different engine performance characteristics.

To be most useful, the UFI comprising the invention of this disclosure must be practiced in accordance with the technology disclosed in U.S. Pat. Nos. 3,176,461 and 3,325,256, the disclosures of which are herely incorporated into this application in its entirety. By so doing, the improved operation of automobile emission control systems employing catalytic converters made possible by the UFI, greatly enhances proper operation of the catalytic converter itself and constitutes the means whereby a substantial savings in the cost of unused fuel can be effected. Hence, the UFI makes the catalytic converter useful, rather than merely being a thing or device required by law without concern about its usefulness or cost. By being useful for conserving fuel, the drivers of automobiles equipped with UFIs should find economic justification for the cost of frequent engine tune-ups and maintaining an efficient and effective catalytic converter system for their automobiles. Thus, in addition to being useful as a fuel cost saving instrument, the UFI serves to facilitate execution of the Federal Clean Air Act requirements, and also is a highly useful safety device for warning the driver of a catalytic converter equipped car that an extremely dangerous increase in fire hazard has occurred due to inefficient fuel use by the automobile engine resulting in excessive conversion activity on the part of the catalytic converter. With regard to this latter point, reference is made to FIG. 4 of the drawings which is a graph of the sensible and potential heat $H_S$ and $H_P$, respectively, contained in automobile engine exhausts for the different mass flow rates indicated. This graph was previously disclosed in U.S. Pat. No. 3,176,461, noted above. The UFI made available by this invention, effectively computes and provides a measure (indication) of the potential heat contained in the engine exhaust to the driver of a vehicle equipped with a UFI and engine emission control system employing an efficient and effective catalytic converter. The potential heat $H_P$ generally varies as shown by the solid line at different low and high mass exhaust gas flow rates, between idling and open throttle operating modes. In comparison, the sensible heat $H_S$ is shown by the broken line and the total heat found in the exhaust from the catalytic converter outlet is indicated by the sum of $H_P+H_S$. This occurs when the converter is functioning (a) with adequate air and warm-up time for converting the air polluting unused fuel from the engine exhaust, (b) with an adequate ratio of mass exhaust gas velocity to active catalyst surfaces, and (c) with essentially constant activity of the catalyst surfaces. The heats shown at points C1 and C2 in FIG. 4 may sum up to a value which may constitute a fire hazard if not properly dissipated or if the condition which produces such oxidation of unused fuel within the catalytic converter is not corrected.

While the description heretofore set forth envisions the use of the UFI with conventional, commercially available catalytic converters and exhaust gas emission control systems such as those used in the past or presently being installed in automobiles, it is preferred that the emission control systems described in U.S. Pat. Nos. 3,176,461 or 3,325,256 be employed in conjunction with the UFI. For this reason, the exhaust emission control system shown in FIG. 1 in conjunction with the UFI also includes the additional elements of a high mass catalytic converter, shown at 50, a vacuum control switch shown at 40, high mass, high temperature exhaust interconnection conduits shown at 35, interconnecting the low mass, relatively low temperature catalytic converter 8 with the high mass, high temperature catalytic converter 50 where the elements 35, 40 and 50 have been given reference numerals corresponding to the similar elements in U.S. Pat. No. 3,176,461. A thermally controlled valve 56 serves to connect clean air from a clean air source to the engine exhaust being supplied to the lower temperature, low mass catalytic converter 8 and to the high mass, high temperature catalytic converter 50 as taught in U.S. Pat. No. 3,176,461. With the inclusion of these additional elements in an automobile engine exhaust emission control system together with the UFI, it is possible not only for the operator of the automobile to conserve otherwise unused fuel that would be burned in the catalytic converters in the manner described in the preceding paragraphs, but in addition under conditions where high mass, high temperature exhaust gas flows are encountered, catalytic conversion of all unused fuel in the engine exhaust will be achieved in the combined lower temperature low mass catalytic converter 8 operating in conjunction with the high temperature, high mass catalytic converter 50 as taught in U.S. Pat. Nos. 3,176,461 and 3,325,256, thereby assuring compliance with the most stringent EPA developed clean air standards which are to come into force in 1985.

From the foregoing description, it will be appreciated that the invention provides a novel Unused Fuel Indicator instrument (UFI) which senses, computes and provides useful information concerning the operation of a catalytic converter equipped exhaust emission control system to the driver of a vehicle powered by unleaded gas, liquid gaseous fuel, or any other fuel which will burn in the engine to produce power. As a result, the UFI enables the driver to act properly (for example, by assuming gentler driving habits) to conserve the unused fuel and operate the engine economically and safely. Additionally, the UFI informs the owner of the vehicle that it is so equipped, whether or not the catalytic converter of the vehicle is actively oxidizing air pollutants such as unburned fuel in conformance with the Clean Air Act requirements and whether, due to the need for an engine tune-up or the like, an excessive amount of unused fuel is being wasted. The UFI is a simple, inexpensive and reliable tool that also may be used by the state, EPA, county or other inspectors in testing cars for air pollution by confirming (or disaffirming) that the engine exhaust emission control system of a car is functioning properly, of malfunctioning, or merely needs tuning. Further, the UFI informs the driver or other person that excessive amounts of unused fuel are being burned in the catalytic converter in such a way that the heat product produced in the converter may be dangerous to the vehicle and things beneath the vehicle such as dry leaves, tall grass and the like. The UFI comprises a simple, reliable and relatively inexpensive thermal-electric/electronic circuit for converting the temperature related electric signals produced by thermocouples attached to the catalytic converter system of an automobile into a readily interpreted readout of the condition of the automobile engine and/or the engine emission control system. The preferred readout employed in the UFI is the sequential glowing of light indicators such as light emitting diodes wherein the sequence in which the LEDs are caused to glow is indicative of the proper functioning (or malfunctioning) of the automobile engine and its associated catalytic converter emission control system. The multi-colored LED readout incrementally indicates the potential heat of the amount of pollutants in an auto exhaust converted by oxidation to heat product in an efficient and effective catalytic converter. The heat product of the catalytic converter is sensed by thermocouples which are differentially connected to produce a temperature difference electric signal indicative of the temperature difference between the catalytic converter's inlet and outlet temperatures. This simple, inexpensive and effective display then readily can be interpreted by an average driver, or an inspector who uses the UFI as a simple, inexpensive and effective engine emission control system monitor.

Having described one embodiment of the Unused Fuel Indicator according to the invention, other modifications, variations and changes in the invention will be suggested to those skilled in the art in the light of the above teachings. It is therefore to be understood that any such changes, modifications and variations in the invention are deemed to be within the scope of the invention as defined by the appended claims.

I claim:

1. An unused fuel indicator for indicating the operating condition of an automobile engine emission control system employing a catalytic converter while the engine is running, said unused fuel indicator comprising:
(a) converter inlet temperature sensing means for effectively sensing the temperature of the engine exhaust gases supplied to the inlet of the catalytic converter and deriving an inlet temperature electric signal representative of the inlet exhaust gas temperature;
(b) converter outlet temperature sensing means for effectively sensing the temperature of the exhaust gases emitted from the outlet of the catalytic converter and deriving an outlet temperature electric signal representative of the converter outlet exhaust gas temperature;
(c) means for differentially processing said inlet and outlet temperature electric signals and deriving therefrom a temperature difference electric signal representative of the difference between the inlet and outlet temperatures of the exhaust gases being processed by the catalytic converter;
(d) electronic processing circuit means supplied with said temperature difference electric signal for processing said temperature difference electric signal to derive different value temperature indicating electric signals representative of different operating temperature ranges for the difference temperature between the inlet and outlet temperatures of the catalytic converter for both normal and abnormal operating conditions; and
(e) indicator means responsive to said different value temperature indicating electric signals for indicating the operating condition of the automobile engine emission control system during operation.

2. An unused fuel indicator according to claim 1 wherein the unused fuel indicator operates continuously as long as the engine and catalytic converter system are operated to provide continuous indications of the operating condition of the emission control system.

3. An unused fuel indicator according to claim 1 wherein said differentially interconnected converter inlet and outlet temperature sensing means comprise differentially connected inlet and outlet thermocouples connected to sense the inlet exhaust gas temperature and the outlet exhaust gas temperature, respectively, of the catalytic converter and to derive an output voltage signal whose voltage magnitude is representative of the temperature difference between the inlet and outlet catalytic converter exhaust gas temperatures.

4. An unused fuel indicator according to claim 1 wherein said electronic processing circuit means comprises voltage comparator circuit means for comparing the voltage of the temperature difference output signal to a plurality of different voltage values representative of different operating temperature ranges for the catalytic converter for both normal and abnormal converter operating conditions and wherein the indicator means in response to the comparator circuit means provides an indication of whether the catalytic converter is operating normally or malfunctioning under the existent and immediate past engine operating conditions.

5. An unused fuel indicator according to claim 1 wherein the indicator means comprises a plurality of different color light emitting diodes which are sequentially responsive to different ranges of voltage amplitude values of said temperature difference signal for sequentially indicating that said temperature difference signal is within a range of voltage values corresponding to a range of exhaust gas temperature difference values indicative of a particular normal or abnormal operating condition for the catalytic converter.

6. An unused fuel indicator according to claim 3 wherein said electronic processing circuit means comprises voltage comparator circuit means for comparing the voltage of the temperature difference output signal to a plurality of different voltage values representative of different operating temperature ranges for the catalytic converter for both normal and abnormal converter operating conditions and wherein the indicator means in response to the comparator circuit means provides an indication of whether the catalytic converter is operating normally or malfunctioning under the existent and immediate past engine operating conditions.

7. An unused fuel indicator according to claim 6 wherein the indicator means comprises a plurality of different color light emitting diodes which are sequentially responsive to different ranges of voltage amplitude values of said temperature difference signal for sequentially indicating that said temperature difference signal is within a range of voltage values corresponding to a range of exhaust gas temperature difference values indicative of a particular normal or abnormal operating condition for the catalytic converter.

8. An unused fuel indicator according to claim 7 wherein the unused fuel indicator operates continuously as long as the engine and catalytic converter system are operated to provide continuous indications of the operating condition of the emission control system.

9. An unused fuel indicator according to claim 1 connected in an automobile engine exhaust emission control system that includes a catalytic converter, a source of auxiliary air and thermally controlled valving means for injecting additional air for the chemical reaction and/or for cooling into the catalytic converter to assure full conversion of unused fuel in the engine exhaust by the catalytic converter.

10. An unused fuel indicator according to claim 9 wherein the automobile engine exhaust emission control system further includes a second high mass, high temperature catalytic converter for reacting to and converting unused fuel in large mass engine exhaust gas flows and automatically operable means for automatically switching said high mass, high temperature catalytic converter into the exhaust gas emission treatment process in response to the occurrence of high mass, high temperature exhaust gas flow.

11. An unused fuel indicator according to claim 8 connected in an automobile engine exhaust emission control system that includes a catalytic converter, a source of auxiliary air and thermally controlled valving means for injecting additional air for the chemical reaction and/or for cooling into the catalytic converter to assure full conversion of unused fuel in the engine exhaust by the catalytic converter, and wherein the automobile engine exhaust emission control system further includes a second high mass, high temperature catalytic converter for reacting to and converting unused fuel in large mass engine exhaust gas flows and automatically operable means for automatically switching said high mass, high temperature catalytic converter into the exhaust gas emission treatment process in response to the occurence of high mass, high temperature exhaust gas flow.

12. The method of incrementally indicating the operating condition of an automobile engine emission control system employing a catalytic converter while the engine is running as a measure of the unused fuel being wasted by the engine and as an indication of the proper functioning or malfunctioning of the emission control system, said method comprising:

(a) sensing the temperature of the inlet exhaust gases supplied to the catalytic converter and the temperature of the gases exhausted from the converter and deriving a temperature difference electric signal representative of the difference between the inlet and outlet temperature values;

(b) categorizing the temperature difference signal by comparing the signal to a plurality of different electric signals whose values are representative of different operating temperature ranges for the temperature difference between the inlet and outlet temperatures of the catalytic converter exhaust gases under both normal and abnormal converter operating conditions; and (c) deriving an output indication of the range of inlet and outlet temperature difference values within which the engine emission control system is operating as a measure of any unused fuel being wasted by the engine and as an indication of the proper functioning or malfunctioning of the catalytic converter under the existent and immediate past engine operating conditions.

* * * * *